Dec. 1, 1925.
M. P. E. RADLOFF
AUTOMOBILE HEADLIGHT
Filed March 24, 1924
1,563,656
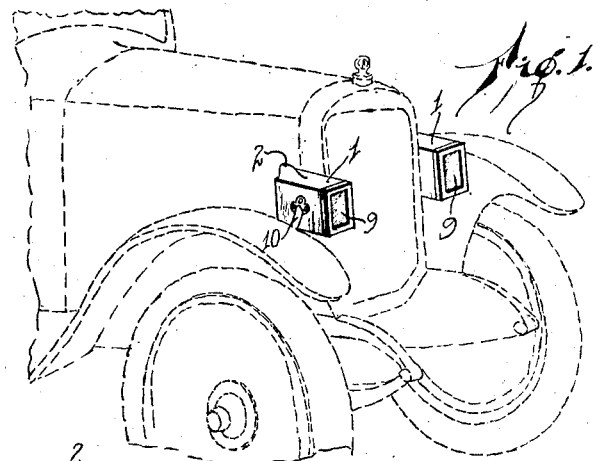
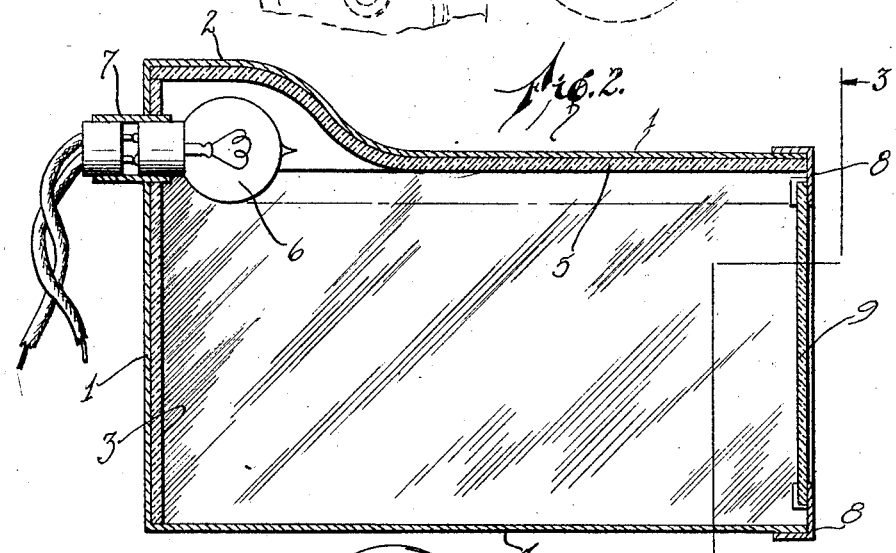
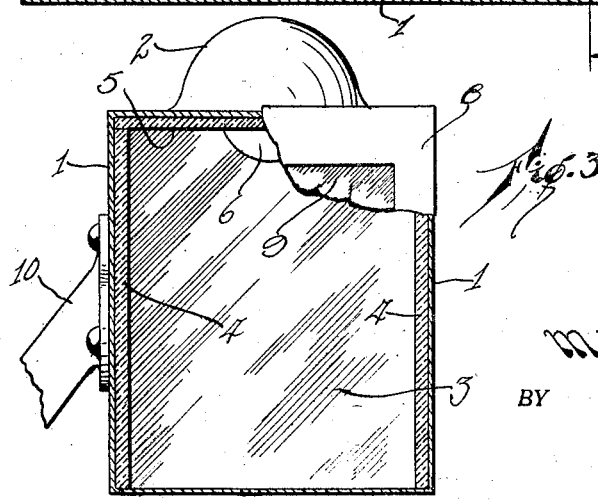
INVENTOR
M.P.E.Radloff
BY
ATTORNEYS Patented Dec. 1, 1925.

1,563,656

UNITED STATES PATENT OFFICE.

MAX P. E. RADLOFF, OF HUSTISFORD, WISCONSIN.

AUTOMOBILE HEADLIGHT.

Application filed March 24, 1924. Serial No. 701,450.

*To all whom it may concern:*

Be it known that I, MAX P. E. RADLOFF, a citizen of the United States, and a resident of Hustisford, county of Dodge, and State of Wisconsin, have invented a new and useful Improvement in Automobile Headlights, of which the following is a full, clear, and exact description.

My invention relates to improvements in automobile headlights, and it consists in the combinations, constructions, and arrangements herein described and claimed.

An object of my invention is to provide a device which will prevent the rays from diverging upwardly and thus blinding an approaching driver.

A further object of my invention is to provide a device of the type described, which is simple in construction and in which means is provided for directing the rays of light forwardly and downwardly, so as to illuminate the road while preventing danger from glare.

Other objects and advantages will appear in the following specification, and the noval features of the invention will be particularly pointed out in the appended claim.

My invention is illustrated in the accompanying drawings, forming part of this application, in which—

Figure 1 is a perspective view showing one embodiment of my invention,

Figure 2 is a central transverse section through the device, and

Figure 3 is a section along the line 3—3 of Figure 2.

In carrying out my invention, I make use of a casing 1 which is preferably rectangular in form. This casing may be made of metal and is provided at its top, toward the rear end thereof, with an extension 2.

At the rear of the casing 1 is a plane mirror 3. Similar mirrors 4 are disposed on the interior of the sides of the casing 1. A mirror 5 is also provided for the interior of the top. This mirror, as will be seen from Figure 2, extends along the recess formed by the extension 2.

A lamp 6 is provided, and is held in the socket 7. The forward end of the lamp has a frame 8 which holds a glass closure 9.

From the foregoing description of the various parts of the device, the operation thereof may be readily understood. The rectangular casing may be supported in any suitable manner, as by a bracket 10. It will be observed that the light 6 is above a horizontal line, passing through the upper effective edge of the light opening covered by the glass plate 9. In other words, even when the casing 1 is disposed horizontally, the light 6 will be hidden in the recess of the extension 2, so that no direct rays can be projected forwardly past the front frame 8 which holds the glass 9. In practice, however, I prefer to tip the casing downwardly to a slight extent, so as to throw the rays downwardly and to prevent the upward divergence of the rays.

It will be observed also that there is no mirror on the bottom of the casing. The mirrors on the side will reflect the light downwardly, as also the mirror on the inside of the top, so that there will be abundant light, but this light will be directed on the road where it should be directed, and not forwardly in the eyes of a driver of an approaching vehicle.

I claim:

A headlight comprising a casing of rectangular cross-section and having an extension at its upper rear edge, the front part of the casing being provided with a glazed opening, an electric light bulb disposed in said extension above the upper edge of the glazed opening, the sides, rear and upper inner faces of the casing being provided with light reflecting surfaces.

MAX P. E. RADLOFF.